Feb. 11, 1941.  J. F. WALLACE  2,231,307
AIR PUMP
Original Filed March 23, 1937
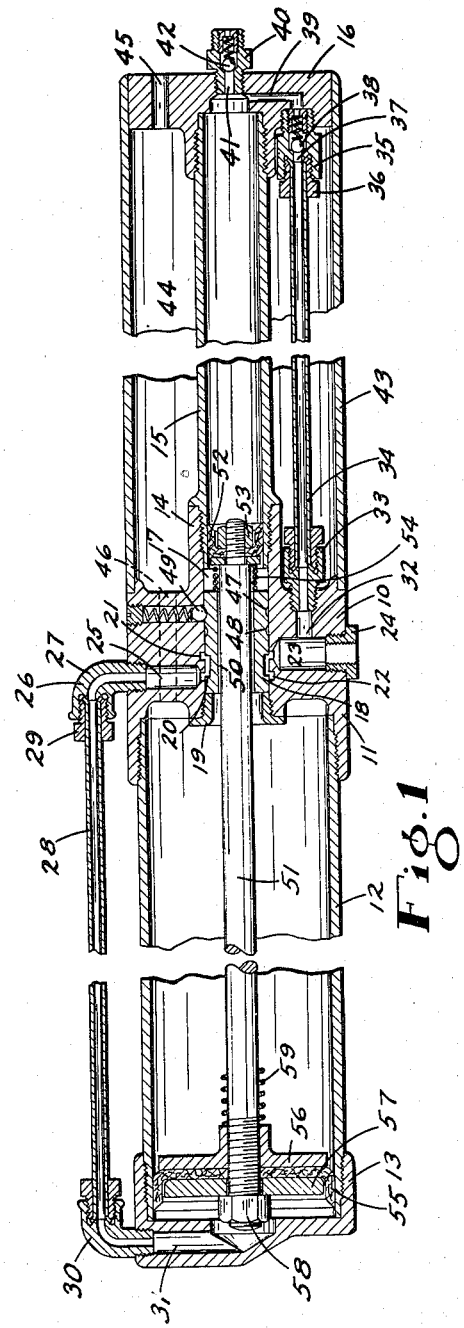
JOHN F. WALLACE
INVENTOR
BY  *John C. Renfer*
ATTORNEY Patented Feb. 11, 1941

2,231,307

UNITED STATES PATENT OFFICE 2,231,307

AIR PUMP

John F. Wallace, University Heights, Ohio, assignor to The Cleveland Pneumatic Tool Company, Cleveland, Ohio, a corporation of Ohio Substitute for abandoned application Serial No. 132,554, March 23, 1937. This application May 10, 1940, Serial No. 334,403

5 Claims. (Cl. 230—52)

This invention relates broadly to an improvement in air pumps, but more particularly to power actuated pumps designed to discharge air under high pressure.

This application is a substitute for my prior application Serial No. 132,554, filed March 23, 1937, and since abandoned.

One object of this invention is to produce an improved high pressure air pump of simple construction which is strong, durable and efficient.

Another object of this invention is to produce a portable air pump, actuated by compressed air and adapted to deliver air under high pressure.

Another object of this invention is to provide a new and improved cooling system for a high pressure portable pump of the reciprocatory piston type.

A further object of this invention is to provide a device of this character which may readily be disabled for cleaning, lubrication or inspection of parts.

Other objects and advantages more or less ancillary to the foregoing reside in the specific construction and aggroupment of the elements peculiar to this structure, as will become apparent from a more complete examination of this specification.

In the drawing which illustrates a preferred form of the invention:

Fig. 1 is a longitudinal sectional view of the pump illustrating the movable parts in one position.

Fig. 2 is a view similar to Fig. 1 illustrating the movable parts in another position.

Referring to the drawing in which like symbols designate corresponding parts throughout the several views, 10 represents a center head having a skirt 11 within which there is threaded in fluid tight engagement therewith one end of a cylindrical casing hereinafter denoted as motor cylinder 12. The other end of this housing is also closed by a cover 13 screwed thereon in fluid tight engagement therewith.

The center head 10 is also formed with a cylindrical stem 14 having screwed therein in fluid tight engagement therewith one end of a barrel or pump cylinder 15 which extends therefrom coaxially with the housing 12, and has its other end carrying a cap 16 mounted thereon in screw tight engagement therewith.

Extending through the center head 10, there is a bore 17 disposed coaxially with the motor cylinder 12 and the pump cylinder 15, and having a sleeve valve 18 slidable therein between the adjacent ends of the pump cylinder 15 and of a bushing 19 secured within the bore 17. This valve is formed with an external annular groove 20 capable of communication with two smaller internal annular grooves 21 and 22 formed within the bore 17, the groove 21 having one end of an inlet port 23 opening therein while the other end carries a bushing 24 adapted to receive one end of a fluid conveying conduit (not shown). Leading from the groove 22, there is a port 25 terminated by a pipe connection 26 mounted therein and comprising an elbow 27 having one end of a small pipe or conduit 28 secured therein by a coupling nut 29. The pipe 28 extends to the outer end of the cylinder 12 where it is connected to the cover 13 by a connection 30, which connection is a replica of the connection 26. From the connection 30, the fluid may be admitted into the motor cylinder 12 through a port 31 provided within the cover 13.

Leading from the inlet port 23, there is a port 32 threaded to receive a pipe connection 33 by which one end of a pipe 34 is connected to the port 32. The pipe 34 extends toward the outer end of the cylinder 15 and has its other end secured to the cap 16 by a pipe connection including a member 35 threaded to receive a coupling nut 36 and having a port 37 therethrough normally closed by a spring pressed check valve 38. From the port 37, the fluid may be admitted into the outer end of the pump cylinder 15 through a port 39 formed within the cap 16. Also secured to the cap 16, there is a conduit connection 40 having a port 41 extending therethrough and opening into the outer end of the cylinder 15, which port is normally closed by a spring pressed check valve 42.

Surrounding the cylinder 15, there is a shroud 43 extending from the center head 10 to the cap 16 to form a cooling chamber 44 around the cylinder 15, and within which is contained the pipe 34. This cooling chamber is in constant communication with the atmosphere through an exhaust port 45 extending through the cap 16, and with the inner end of the motor housing 12 through a passage 46 extending through the center head 10.

The valve 18 is also provided with two external annular grooves 47 and 48 adapted to receive a spring pressed ball or detent 49 for locking the valve in two different positions.

Extending through the valve 18, there is a bore 50 having a piston rod 51 slidable therethrough and having one end projecting into the cylinder 15 to receive a piston formed of a flexible packing 52 secured thereto by a nut 53. A compression spring 54 is loosely mounted on the piston rod 51 between the piston 52 and the valve 18, the purpose of which will be explained later.

The other end of the piston rod 51 extends into the motor cylinder 12 to receive a piston formed of a flexible packing 55 clamped between two plates 56 and 57, the plate 56 being screwed on the rod 51, while the plate 57 is secured in position by a nut 58. A compression spring 59 is also loosely mounted on the piston rod between the valve 18 and the piston 55.

The valve bore 50 through which the piston rod is free to slide, is of a diameter materially larger than that of the rod, thereby affording an annular passage between the lower end of the barrel 15 and the upper end of the motor cylinder 12.

In the operation of the device, compressed air from its source of supply is admitted into the inlet port 23 through the connection 24. When the pistons and the valve are positioned as shown in Fig. 1, the compressed fluid from the port 23 will flow into the port 25 via the grooves 21, 20 and 22, from where it will be admitted into the outer end of the motor cylinder 12 through the pipe 28 and the port 31. Simultaneously the pressure fluid from the port 23 will flow into the pump cylinder 15 via the port 32, the pipe 34 and the ports 37 and 39. During this inlet flow of the pressure fluid into the cylinder 15, the check valve 37 is shifted in open position relative to the port 37 due to the inlet flow of the pressure fluid, while the check valve 42 remains temporarily in a closed position relative to the port 41 due to the compression spring acting on the valve 42, which compression is calculated to withstand the pressure of the fluid admitted into the pump cylinder 15. The pressure fluid acting on the piston 55 will drive the latter toward the inner end of the housing 12, thereby effecting the corresponding movement of the piston 52 into the pump cylinder 15.

As shown, the diameter of the motor piston 55 is materially larger than that of the pump piston 52, in fact the cross sectional area of the former is calculated to be about ten times larger than that of the latter, thus providing a ten to one compression ratio between the two pistons. The compressed air admitted into the inlet port 23 and distributed therefrom into the motor cylinder 12 and the pump cylinder 15, is usually obtained from small portable compressors delivering air under an average pressure of 100 pounds per square inch. This compressed air acting on the motor piston 55 will drive the pump piston 52 to force the air therefrom under higher pressure through the connection 40 by opening the check valve 42, while the check valve 37 is now closed by air under higher pressure flowing from the cylinder 15. Should the element 40 be connected to a tank or the like within which highly compressed air is needed, it will be understood that due to the difference between the cross sectional areas of the two pistons, the air admitted into the tank may reach a pressure about ten times higher than that of the air admitted into the inlet port 23.

Toward the end of the working stroke of the piston 55, the compression spring 59 will engage the valve 18 to shift it into the position shown in Fig. 2, thereby preventing the flow of the pressure fluid from the inlet port 23 into the motor cylinder 12. During this position of the valve 18, the pressure fluid is still admitted from the inlet port 23 into the cylinder 15 via the pipe 34, thereby acting on the piston 52 for driving it, together with the piston 55, into the position shown in Fig. 1. Simultaneously, the pressure fluid previously admitted into the motor cylinder 12, is exhausting from the outer end into the inner end thereof via the port 31, the pipe 28, the port 25 and the bore 17. From the inner end of the cylinder 12, the exhausting fluid will flow into the cooling chamber 44 via the port 36, where it will flow around the pump cylinder 15 and finally escape to the atmosphere through the port 45. The flow of the exhausting fluid through the chamber 44 and around the cylinder 15 will act as a cooling medium for the cylinder, thereby preventing the latter from reaching an excessive temperature which would otherwise result from the high compression taking place therein.

During the return movement of the pistons above referred to, air under atmospheric pressure which may be contained within the cylinder 15 under the piston 52, is also free to exhaust therefrom through the valve bore 50 into the inner end of the motor cylinder 12, from where it will escape to the atmosphere through the port 26, the chamber 44 and the exhaust port 45.

Toward the end of the return stroke of the pistons, the compression spring 54 engaging the valve 18, will be compressed by the piston 52 to cause the shifting of the valve from the position shown in Fig. 2 to the position shown in Fig. 1. In this last position of the valve, the compressed air will again be admitted into the motor cylinder 12 in the manner previously described to cause the compression of the air continuously admitted into the cylinder 15. During the working stroke of the piston 56, the air under atmospheric pressure contained within the motor cylinder 10 between the piston 55 and the center head 10 is free to exhaust therefrom through the port 46, the cooling chamber 44 and the exhaust port 45.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. In a device of the character described, the combination of a motor and pump each including a cylinder having a piston slidable therein, said cylinders being mounted coaxially with a center head therebetween, a bore extending through said center head, a rod connecting said pistons slidable through said bore, means for admitting motive fluid on one side of the motor piston for effecting the working stroke of said pistons and on one side of said pump piston for effecting the return stroke of said pistons, and means including said bore affording communication of said one side of the motor piston and the other side of said pump piston with the atmosphere during the return stroke aforesaid.

2. In a device of the character described, the combination of a motor and a pump each including a cylinder having a piston slidable therein, said cylinders being mounted coaxially with a center head therebetween, a bore extending through said center head having a valve slidable therein, a bore through said valve, a rod connecting said pistons slidable through said valve bore, passageways for admitting motive fluid on one side of the motor piston for effecting the working stroke of the pistons and on one side of the pump piston for effecting the return stroke of the pistons, said valve being actuated by said pistons for controlling one of said passageways, and means for venting the other side of said pump piston during the return stroke thereof including said valve and said center head bore and for simultaneously venting said one side of said motor piston including said center head bore.

3. In a device of the character described, a motor housing and a pump housing mounted coaxially, a center head between said housings having a bore extending therethrough, a slidable piston within each housing interconnected by a rod extending through said bore, a valve slidable within said bore, a passageway for each of said housings admitting piston actuating fluid therein contacting with and acting on said piston, said valve being actuated by said pistons for controlling one of said passageways, means subjected to pressure conditions within said pump housing for controlling the other of said passageways, and means including said bore for exhausting motive fluid from at least one of said housings during a predetermined position of said valve.

4. In a device of the character described, a motor cylinder and a pump cylinder mounted coaxially, a center head between said cylinders having a bore extending therethrough, a slidable piston within each cylinder interconnected by a rod extending through said bore, a valve slidable within said bore, a duality of passageways for alternatively admitting motive fluid into the outer ends of said cylinders for effecting the working and return strokes of said pistons, said valve being actuated by said pistons for controlling one of said passageways, means subjected to pressure conditions within said pump cylinder for controlling the other of said passageways, and means including said bore and valve for constantly venting the inner ends of said cylinders.

5. In a device of the character described, a motor cylinder and a pump cylinder mounted coaxially, a center head between said cylinders, a slidable piston within each cylinder interconnected by a rod slidable through said center head, a duality of passageways for alternatively admitting motive fluid into the outer ends of said cylinders for effecting the working and return strokes of said pistons, an exhaust port through said center head for constantly venting the inner ends of said cylinders, and means including one of said passageways and said exhaust port for venting the outer end of said motor cylinder during the return strokes of said pistons.

JOHN F. WALLACE.